(12) United States Patent
Locke et al.

(10) Patent No.: US 10,614,627 B2
(45) Date of Patent: *Apr. 7, 2020

(54) HOLOGRAPHIC TECHNOLOGY IMPLEMENTED SECURITY SOLUTION

(71) Applicant: TYCO FIRE & SECURITY GMBH, Neuhausen am Rheinfall (CH)

(72) Inventors: Robert B. Locke, Sonoma, CA (US); Paul B. Rasband, Fremont, CA (US); Rain Cui, San Mateo, CA (US); Steve Schattmaier, Dana Point, CA (US); Richard Campero, Gilroy, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,396

(22) Filed: Dec. 16, 2016

(65) Prior Publication Data

US 2018/0018861 A1   Jan. 18, 2018

Related U.S. Application Data

(60) Provisional application No. 62/361,669, filed on Jul. 13, 2016, provisional application No. 62/361,053, filed on Jul. 12, 2016.

(51) Int. Cl.
*H04N 7/18* (2006.01)
*G06T 19/00* (2011.01)
(Continued)

(52) U.S. Cl.
CPC .......... *G06T 19/006* (2013.01); *G02B 27/017* (2013.01); *G06F 3/005* (2013.01);
(Continued)

(58) Field of Classification Search
CPC ........... G08B 13/19656; H04N 13/332; H04N 13/204; H04N 7/181; H04N 13/0203;
(Continued)

(56) References Cited

U.S. PATENT DOCUMENTS 5,357,148 A * 10/1994 Rotay .................... H03F 1/302
327/312
7,249,064 B1   7/2007 Carmen
(Continued)

OTHER PUBLICATIONS

Sala et al, Personal identification through 3D biometric measurments based on stereoscopic image pairs (Year: 2006).*
(Continued)

*Primary Examiner* — Shan E Elahi
(74) *Attorney, Agent, or Firm* — Foley & Lardner LLP

(57) ABSTRACT

Disclosed are techniques that use mixed reality, e.g., augmented reality and virtual reality technologies to improve analysis of security situations. The techniques allow a guard (or other user in a facility) to observe persons in a facility and determine merely by looking at such persons through a mixed reality device whether those persons are authorized to be in the facility or not, irrespective of whether those persons are required or not required to publically display some credentials, such as a badge or the like.

20 Claims, 7 Drawing Sheets

(51) Int. Cl.

| | |
|---|---|
| *G06N 3/00* | (2006.01) |
| *G06K 9/00* | (2006.01) |
| *H04N 13/204* | (2018.01) |
| *H04N 13/344* | (2018.01) |
| *H04N 13/398* | (2018.01) |
| *G06F 3/00* | (2006.01) |
| *G06F 3/01* | (2006.01) |
| *G06F 3/14* | (2006.01) |
| *G06Q 30/02* | (2012.01) |
| *H04N 13/332* | (2018.01) |
| *G07C 9/00* | (2020.01) |
| *G06F 3/16* | (2006.01) |
| *G06N 5/04* | (2006.01) |
| *G06Q 50/00* | (2012.01) |
| *G06F 17/21* | (2006.01) |
| *G06F 17/24* | (2006.01) |
| *G06F 17/27* | (2006.01) |
| *G10L 15/22* | (2006.01) |
| *G10L 15/26* | (2006.01) |
| *G02B 27/01* | (2006.01) |
| *G08B 13/196* | (2006.01) |
| *G06T 19/20* | (2011.01) |
| *G10L 15/30* | (2013.01) |

(52) U.S. Cl.
 CPC ............ *G06F 3/017* (2013.01); *G06F 3/1446* (2013.01); *G06F 3/16* (2013.01); *G06F 3/167* (2013.01); *G06F 17/218* (2013.01); *G06F 17/241* (2013.01); *G06F 17/2705* (2013.01); *G06K 9/00288* (2013.01); *G06K 9/00362* (2013.01); *G06K 9/00671* (2013.01); *G06K 9/00771* (2013.01); *G06N 3/006* (2013.01); *G06N 5/043* (2013.01); *G06Q 30/0201* (2013.01); *G06Q 30/0269* (2013.01); *G06Q 50/01* (2013.01); *G07C 9/00087* (2013.01); *G10L 15/22* (2013.01); *G10L 15/26* (2013.01); *H04N 7/183* (2013.01); *H04N 13/204* (2018.05); *H04N 13/332* (2018.05); *H04N 13/344* (2018.05); *H04N 13/398* (2018.05); *G02B 2027/014* (2013.01); *G02B 2027/0134* (2013.01); *G02B 2027/0141* (2013.01); *G06T 19/20* (2013.01); *G06T 2219/004* (2013.01); *G08B 13/19608* (2013.01); *G08B 13/19656* (2013.01); *G10L 15/30* (2013.01); *G10L 2015/223* (2013.01)

(58) Field of Classification Search
 CPC ............ H04N 13/0429; G07C 9/00087; G02B 27/017; G02B 2027/014; G02B 2027/0134; G06T 19/006; G06K 9/00288
 USPC ......................................................... 348/40
 See application file for complete search history.

(56) References Cited

U.S. PATENT DOCUMENTS

| | | | | |
|---|---|---|---|---|
| 8,009,100 | B2* | 8/2011 | Falk | G01S 5/0221 342/465 |
| 8,223,088 | B1 | 7/2012 | Gomez et al. | |
| 8,965,460 | B1 | 2/2015 | Rao et al. | |
| 9,672,707 | B2* | 6/2017 | Kerzner | G08B 13/19645 |
| 9,721,373 | B2 | 8/2017 | Marsella | |
| 9,811,990 | B2* | 11/2017 | Kerzner | G08B 13/19645 |
| 9,823,744 | B2* | 11/2017 | Publicover | G06K 9/0061 |
| 10,049,544 | B2* | 8/2018 | Kerzner | H04N 5/04 |
| 2002/0003571 | A1* | 1/2002 | Schofield | B60C 23/00 348/148 |
| 2003/0025599 | A1* | 2/2003 | Monroe | G08B 13/19602 340/531 |
| 2003/0158771 | A1 | 8/2003 | Shen et al. | |
| 2004/0075738 | A1* | 4/2004 | Burke | G08B 13/19656 348/143 |
| 2004/0105570 | A1* | 6/2004 | Venetianer | G06K 9/00778 382/100 |
| 2004/0125207 | A1* | 7/2004 | Mittal | G06K 9/00771 348/169 |
| 2005/0010649 | A1* | 1/2005 | Payne | G08B 13/19656 709/217 |
| 2005/0137890 | A1* | 6/2005 | Bhatt | G06Q 10/08 705/325 |
| 2005/0184867 | A1* | 8/2005 | Osann, Jr. | G05B 15/02 340/539.25 |
| 2005/0207487 | A1 | 9/2005 | Monroe | |
| 2006/0136575 | A1* | 6/2006 | Payne | G07C 9/00087 709/219 |
| 2006/0179463 | A1* | 8/2006 | Chisholm | G08B 13/19656 725/90 |
| 2007/0072662 | A1* | 3/2007 | Templeman | A63F 13/00 463/6 |
| 2008/0071559 | A1 | 3/2008 | Arrasvuori | |
| 2008/0189169 | A1 | 8/2008 | Turpin et al. | |
| 2008/0246136 | A1* | 10/2008 | Haba | H01L 23/3128 257/686 |
| 2009/0022362 | A1 | 1/2009 | Gagvani et al. | |
| 2009/0102859 | A1 | 4/2009 | Athsani et al. | |
| 2009/0267836 | A1* | 10/2009 | Falk | G01S 5/0221 342/378 |
| 2010/0225006 | A1* | 9/2010 | Haba | H01L 23/3128 257/774 |
| 2011/0058036 | A1 | 3/2011 | Metzger et al. | |
| 2011/0090334 | A1 | 4/2011 | Hicks et al. | |
| 2011/0167010 | A1* | 7/2011 | Soppera | G06Q 10/08 705/318 |
| 2011/0213664 | A1 | 9/2011 | Osterhout et al. | |
| 2011/0225069 | A1 | 9/2011 | Cramer et al. | |
| 2012/0195464 | A1 | 8/2012 | Ahn | |
| 2012/0242698 | A1* | 9/2012 | Haddick | G02B 27/0093 345/633 |
| 2012/0290521 | A1 | 11/2012 | Frank et al. | |
| 2013/0050262 | A1 | 2/2013 | Jeon | |
| 2013/0065390 | A1* | 3/2013 | Haba | H01L 23/3128 438/637 |
| 2013/0120135 | A1 | 5/2013 | Benson et al. | |
| 2013/0241760 | A1* | 9/2013 | Chen | G01S 13/04 342/27 |
| 2014/0002236 | A1* | 1/2014 | Pineau | G06F 21/32 340/5.6 |
| 2014/0081858 | A1* | 3/2014 | Block | G07F 19/207 705/43 |
| 2014/0160250 | A1* | 6/2014 | Pomerantz | H04N 5/23229 348/47 |
| 2014/0180972 | A1 | 6/2014 | Boldyrev et al. | |
| 2014/0236903 | A1* | 8/2014 | DiRienzo | G06F 17/30312 707/661 |
| 2014/0344420 | A1 | 11/2014 | Rjeili et al. | |
| 2014/0361956 | A1 | 12/2014 | Mikhailov et al. | |
| 2015/0020086 | A1 | 1/2015 | Chen et al. | |
| 2015/0112826 | A1 | 4/2015 | Crutchfield, Jr. | |
| 2015/0317418 | A1 | 11/2015 | Sankarapandian et al. | |
| 2015/0317501 | A1* | 11/2015 | Safai | G06K 7/10366 340/5.8 |
| 2016/0062459 | A1* | 3/2016 | Publicover | G06F 21/64 345/633 |
| 2016/0070343 | A1 | 3/2016 | Li | |
| 2016/0085302 | A1* | 3/2016 | Publicover | G06F 21/64 345/633 |
| 2016/0124071 | A1* | 5/2016 | Baxley | G01S 5/0263 348/143 |
| 2016/0209648 | A1* | 7/2016 | Haddick | G02B 27/0093 |
| 2016/0232777 | A1 | 8/2016 | Jedwab | |
| 2016/0267759 | A1* | 9/2016 | Kerzner | G08B 13/19645 |
| 2016/0269491 | A1 | 9/2016 | Eom et al. | |
| 2016/0274660 | A1* | 9/2016 | Publicover | G06F 21/64 |
| 2016/0316189 | A1* | 10/2016 | Lee | G03B 17/561 |

(56) References Cited

U.S. PATENT DOCUMENTS

| | | | |
|---|---|---|---|
| 2017/0039829 A1* | 2/2017 | Kerzner | G08B 13/19645 |
| 2017/0090556 A1 | 3/2017 | Baba et al. | |
| 2017/0263091 A1* | 9/2017 | Kerzner | G08B 13/19645 |
| 2017/0368439 A1 | 12/2017 | Khazanov et al. | |
| 2018/0018681 A1* | 1/2018 | Locke | G06Q 30/0201 |
| 2018/0018708 A1* | 1/2018 | Locke | G06Q 30/0269 |
| 2018/0018823 A1* | 1/2018 | Cianciolo | G06T 19/006 |
| 2018/0018824 A1* | 1/2018 | Locke | G06T 19/006 |
| 2018/0018862 A1* | 1/2018 | Kerzner | G08B 13/19645 |
| 2018/0018867 A1* | 1/2018 | Locke | G08B 29/185 |
| 2018/0268219 A1* | 9/2018 | Miller | G06K 9/00671 |
| 2018/0286134 A1* | 10/2018 | Warhol | G06F 3/011 |
| 2018/0303667 A1* | 10/2018 | Peyman | A61B 3/12 |
| 2018/0350217 A1* | 12/2018 | Kerzner | G08B 13/19645 |

OTHER PUBLICATIONS

"*Microsoft HoloLens*," Wikipedia, (May 3, 2018), (Retrieved from the Internet): https://en.wikipedia.orrg/wiki/Microsoft_HoloLens.

Notice of Allowance for U.S. Appl. No. 15/381,588, dated Jul. 5, 2018, 8 pages.

Office Action for U.S. Appl. No. 15/379,657, dated Jun. 28, 2018, 10 pages.

Office Action for U.S. Appl. No. 15/381,588, dated Dec. 12, 2017, 9 pages.

Final Office Action on U.S. Appl. No. 15/379,657 dated Feb. 21, 2019.

Non-Final Office Action on U.S. Appl. No. 15/379,647 dated Dec. 14, 2018.

\* cited by examiner

HOLOGRAPHIC TECHNOLOGY IMPLEMENTED SECURITY SOLUTION

CLAIM OF PRIORITY

This application claims priority under 35 U.S.C. § 119(e) to provisional U.S. Patent Application 62/361,053, filed on Jul. 12, 2016, entitled: "Holographic Technology Implemented Security and Retail Solutions" the entire contents of which is incorporated herein by reference and provisional U.S. Patent Application 62/361,669, filed on Jul. 13, 2016, entitled: "Holographic Technology Implemented Security and Retail Solutions the entire contents of which is incorporated herein by reference.

BACKGROUND

This description relates to intrusion, surveillance and alarm systems of various types (generally security systems) and integrated versions of such security systems that combine two or more of such systems.

It is common for businesses and homeowners to have a security system for detecting alarm conditions at their facility and signaling the conditions to a monitoring station or authorized users of the security system. For example, such buildings employ systems in the areas of fire detection, smoke detection, intrusion detection, access control, video surveillance etc. Many different types of security sensors are deployed in such commercial and residential buildings. Sensors (detectors) can be of various types such as motion detectors, cameras, proximity sensors, etc.

Augmented reality, virtual reality and mixed reality technologies are known. Generally, virtual reality refers to technologies that replicate an environment with a simulation of a user being immersed in the replicated environment. Augmented reality, generally refers to technologies that present a view of a real-world environment augmented with computer generated data. Mixed reality a relatively new term generally involves technologies that involve a merging of real world and virtual world environments where real and virtual objects exist and interact.

SUMMARY

According to an aspect, a system includes detectors that detect presence of r.f. emitters in a facility that provide indications of valid authorizing devices, one or more server systems configured to receive video of persons within a field of view of camera, process the received video to determine information that identifies persons in the field of view, determine those identified persons that are sending signals to the detectors signals indicating that they are in possession of a valid authorizing device, determine whether those identified are authorized persons or not authorized persons and cause a mixed reality device to render an indicium according to whether the video of persons within the field of view of the mixed reality device are authorized or unauthorized.

Aspects also include methods and computer program products.

One or more of the following advantages may be provided by one or more of the above aspects.

The servers in conjunction with mixed reality and/or augmented reality devices and virtual reality technologies improve analysis of security situations. The disclosed techniques use computer implemented techniques that obtain information from various electronic systems/devices in the physical world, which devices are exemplified by security systems, and merge that information into a virtual world of policies and analytics that involve such security systems.

One or more of the above aspects allow a guard (or other user in a facility) to observe persons in a facility and determine merely by looking at such persons through the mixed reality device whether those persons are authorized to be in the facility or not, irrespective of whether those persons are required or not required to publically display some credentials, such as a badge or the like. The mixed reality device can display an indicator that indicates whether that person (which the guard is currently viewing) is authorized to be in the current location in which the guard sees the person. The mixed reality device used will send a video stream to the cloud computers that apply various analytics to the video stream to determine if the person currently being view is authorized to be in the location.

The details of one or more embodiments of the invention are set forth in the accompanying drawings and the description below. Other features, objects, and advantages of the invention is apparent from the description and drawings, and from the claims.

DETAILED DESCRIPTION

Figure 1:
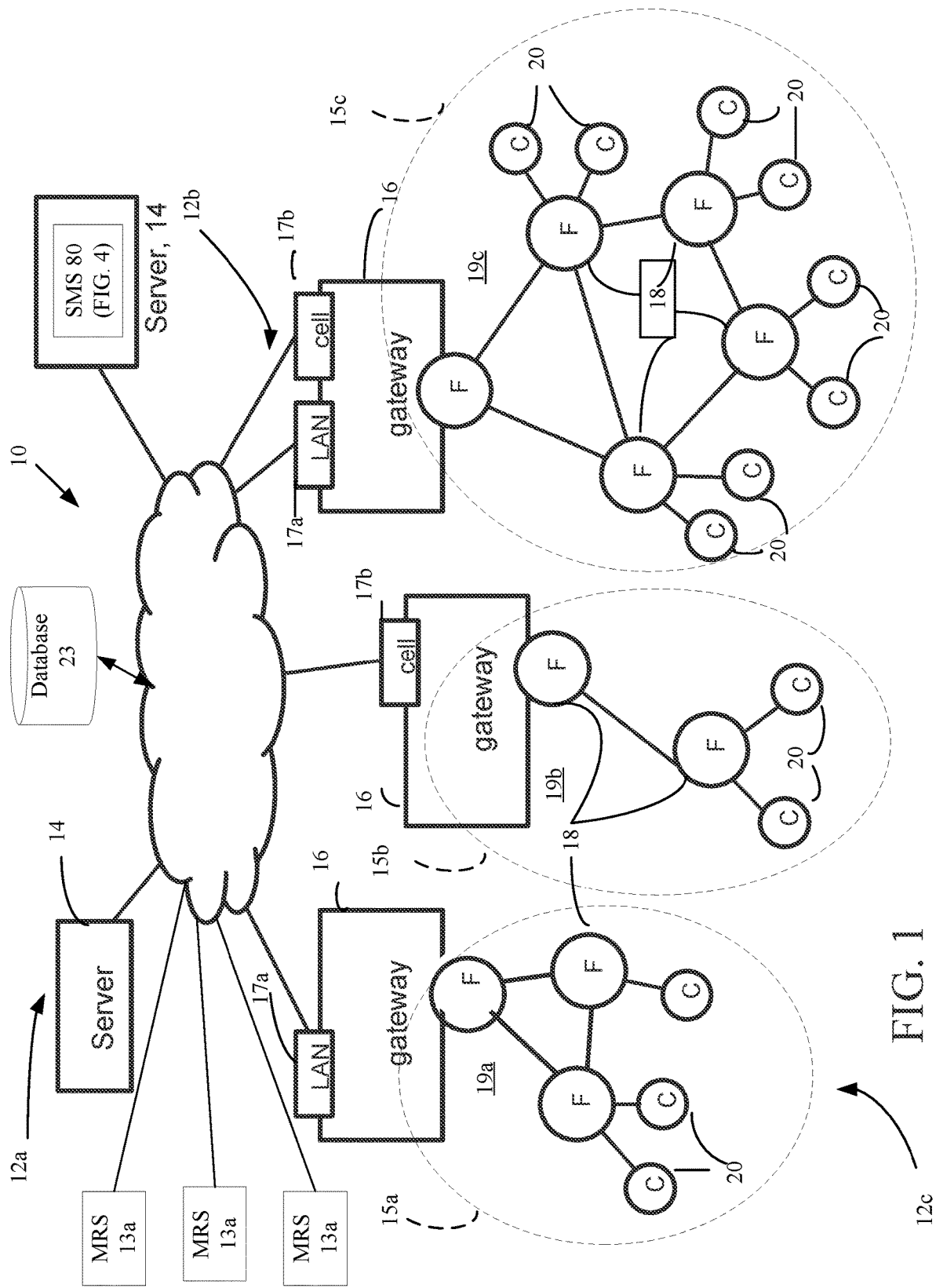
FIG. 1 is a schematic diagram of an exemplary networked security system integrated with mixed reality device processing.

As shown in FIG. 1, described herein are examples of an integrated platform 10 that integrates via a distributed network 11, mixed reality devices 13a-13c with security/intrusion/alarm/surveillance systems 15a-15c (typically including sensors 20, functional nodes 18 and typically including a panel not shown).

Examples of mixed reality devices 13a-13c are those in which the mixed reality devices incorporate a live, real world presentation of elements of the physical real-world with virtual elements that are calculated or produced from inputs and which are rendered on a display so that to a user these calculated or produced elements are perceived to exist together with the physical real world in a common environment. Examples of such mixed reality devices 13a-13c include mixed reality devices such as Hololens® (Microsoft), (a smart-glasses, cordless, Windows 10® (Microsoft) computer headset that includes various sensors and a high-definition stereoscopic 3D optical head-mounted display, and spatial sound to allow for augmented reality applications. Other mixed reality devices/augmented reality systems such as Google Glass® (Google) could be used. There are many such systems on the market of which these are two examples.

The security systems 15a-15c typically include a panel (not shown), such as for an intrusion detection system, an intrusion detection panel that is wired or wirelessly connected to a variety of sensors deployed in a facility. Typically, such panels receive signals from one or more of these sensors to indicate a current state or value or that a particular condition being monitored has changed or become unsecure.

The integrated platform 10 includes data collection systems that are coupled to wireless sensor networks and wireless devices, with remote server-based monitoring via servers 14 and report generation. As described in more detail below, wireless sensor networks generally use a combination of wired and wireless links between computing devices, with wireless links usually used for the lowest level connections (e.g., end-node device to hub/gateway 16). In an example network, the edge (wirelessly-connected) tier of the network is comprised of resource-constrained devices 20 with specific functions. These devices 20 may have a small-to-moderate amount of processing power and memory, and may be battery powered, thus requiring that they conserve energy by spending much of their time in sleep mode. A typical model is one where the edge devices 20 generally form a single wireless network in which each end-node communicates directly with its parent node (e.g., 18) in a hub-and-spoke-style architecture. The parent node may be, e.g., an access point on a gateway or a sub-coordinator which is, in turn, connected to the access point or another sub-coordinator.

In FIG. 1, the distributed network 11 is logically divided into a set of tiers or hierarchical levels 12a-12c. The mixed reality devices 13a-13n are shown in communication with the top one or two tiers or hierarchical levels 12a-12c. In FIG. 1, the lower level tier 12c is illustrated divided into different facility 19a-19c for ease in explaining details of the applications that will be discussed below. The facility 19a-19c are each associated with one of the security systems 15a-15c. The security systems can be independent meaning that there are no connections (as shown) among fully functional nodes of different facility or dependent meaning that there are connections (not shown) among fully functional nodes of different facility.

Figure 4:
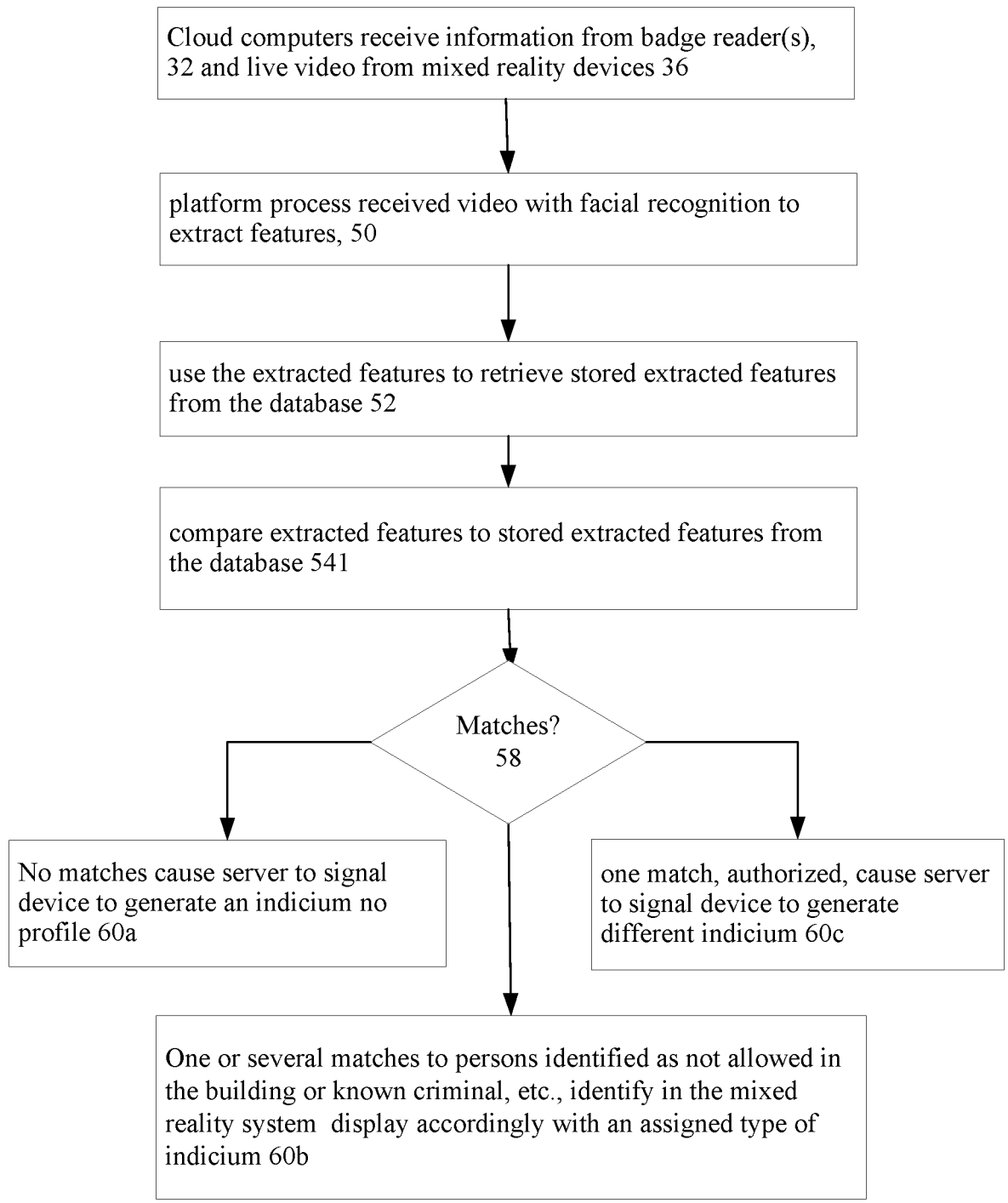

In the upper tier or hierarchical level 12a of the network are disposed servers and/or virtual servers 14 running a cloud computing paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 11 has direct links between devices (nodes) as shown and discussed below. Servers 14 execute analytics (analysis programs of various sorts) that are managed in concert with a session manager system 80 (FIG. 4). The servers 14 can access a database 23.

The second logically divided tier or hierarchical level 12b, referred to here as a middle tier, involves gateways 16 located at central, convenient places inside individual buildings and structures, e.g., 13a-13c. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b. Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 11.

The distributed network 11 implements a state machine approach to an application layer that runs on the lower tier devices 18 and 20. States in the state machine are comprised of sets of functions that execute in coordination, and these functions can be individually deleted or substituted or added to in order to alter the states in the state machine of a particular lower tier device. The state function based application layer uses an edge device operating system that allows for loading and execution of individual functions (after the booting of the device) without rebooting the device (so-called "dynamic programming"). In other implementations, edge devices could use other operating systems provided such systems allow for loading and execution of individual functions (after the booting of the device) preferably without rebooting of the edge devices.

Figure 2:
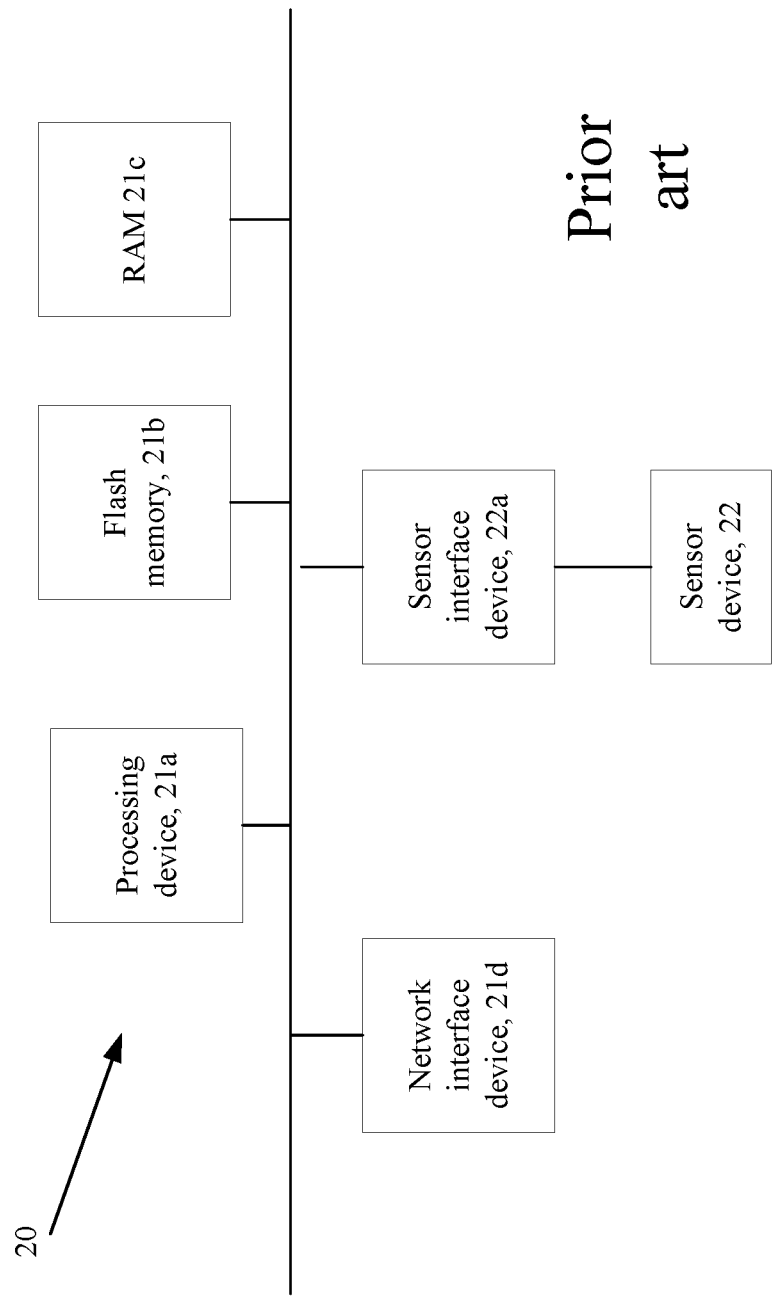
FIG. 2 is a block diagram of a constrained device used in security setting.

Referring to FIG. 2, a generic constrained computing device 20 that is part of the security/intrusion/alarm/surveillance systems (either integrated examples of such system or standalone examples) is shown. A constrained device 20 as used herein is a device having substantially less persistent and volatile memory other computing devices, sensors, systems in a particular networked detection/sensor/alarm system. Constrained device 20 includes a processor device 21a, e.g., a CPU and or other type of controller device that executes under an operating system, generally with 8-bit or 16-bit logic rather than the 32- and 64-bit logic used by high-end computers and microprocessors. The constrained device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less.

The constrained device 20 has a network interface card 21d that interfaces the constrained device 20 to the network 11. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The constrained device 20 also includes a sensor 22 and a sensor interface 22a that interfaces to the processor 21a. Sensor 22 can be any type of sensor type device. Typical types of sensors include temperature, simple motion, 1- 2- or 3-axis acceleration force, humidity, pressure, selective chemical, sound/piezo-electric transduction, and/or numerous others, implemented singly or in combination to detect complex events.

The disclosed implementations of a constrained device 20 can follow the current constraints on flash/persistent storage memory and RAM memory and less than 10-20 kilobytes of RAM/volatile memory, but can have more depending on configuration and in some instances the operating system. These constrained devices 20 are configured in this manner; generally due to cost/physical configuration considerations. These types of constrained devices 20 generally have a static software image (i.e., the logic programmed into the constrained device is always the same).

Constrained devices 20 execute a real-time operating system that can use dynamic programming and support. The real-time operating system ("RTOS") executes and otherwise manages a dynamic set of user-defined independent executable functions or tasks that are either built into a loaded image (software and RTOS that executes on the constrained device) or that are downloaded during normal operation of the constrained device 20 or a combination of the two, with the former (built into the image) using as subroutines instances of the latter (downloaded during operation). Certain of the applications set forth below will cause systems to access these constrained devices 20 to upload data and otherwise control the devices 20 according to needs of the applications.

In the examples below, a facility can be any type but is typically, e.g., a commercial, industrial, facility, with interior areas, (buildings) and exterior areas that are subject to surveillance and other types of monitoring. The buildings can be of any configuration, wide open spaces such as a warehouse, to compartmentalized facilities such as labs/offices.

Figure 3:
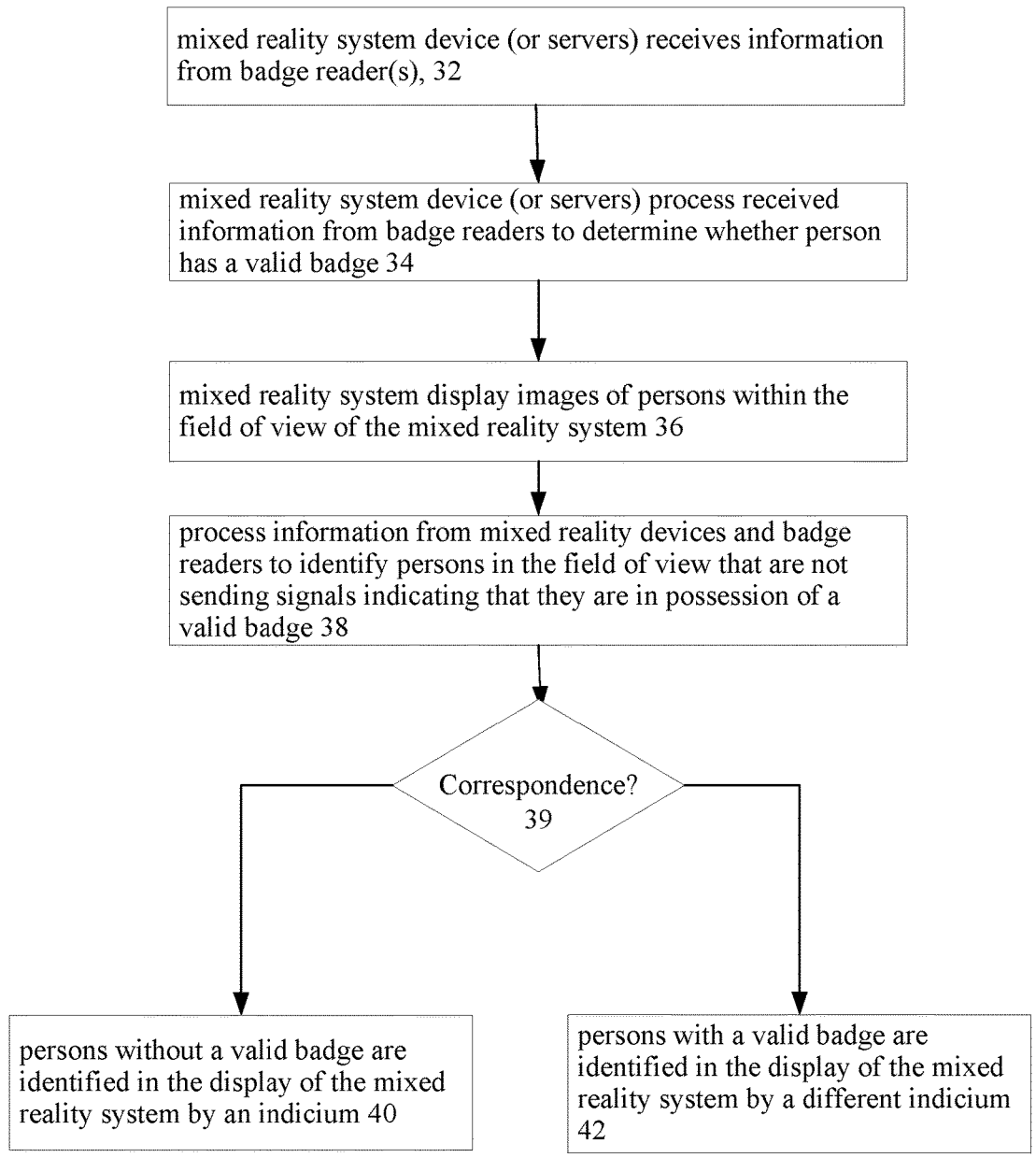
FIGS. 3-6 are flow charts depicting application processing using mixed reality devices adapted for security solutions.

Referring now to FIG. 3, an enhanced security identification process 30 is shown. The enhanced security identification process 30 uses mixed reality device technology and security systems/components to provide a system in which a user, e.g., a security guard can access enhanced information regarding people in a building (facility). Using the enhanced security identification process 30 information about people that a security guard passes during his rounds is displayed on the mixed reality device 13a.

The mixed reality device 13a receives 32 information from a badge reader and processes 34, badge information or sends the information for processing by a server 14 (FIG. 1). In other implementations badge readers send the information directly to the server computer systems 14.

The mixed reality device 13a acquires via cameras affixed to the device 13a images with a field of view and displays 36 these images on the display portion of the mixed reality device 13a.

Both the image data and the badge data are analyzed 38 (discussed below) to determine whether there are correspondences between persons in images and badge information, i.e., persons without a valid badge. Those persons that do not have a badge or who have an invalid badge would be identified 40 by the mixed reality device 13a on the display of the mixed reality device by the device being configured to render an indicium in an image of the person adjacent the location of the person in the image as rendered on the display of the mixed reality device 13a. Various types of indicia can be used including the mixed reality device forming an outline in a color, e.g., in red, about or adjacent the person's image in the display and lock that outline to the person's image as the user, e.g., the security guard, and the person, i.e., without a valid badge move about the facility.

If a person has a valid badge, then the mixed reality device 13a can be configured to render 42 another indicium in the image of the person with the valid badge adjacent the location of that person in the image as rendered on the display of the mixed reality device 13a. This other indicium could be a green outline on the person's image in the display, as one example.

Alternatively, the mixed reality device can be coupled to a system that includes facial recognition system software. A camera mounted on the mixed reality device 13a generates video of persons in the field of view of the mixed reality device 13a and the video is sent to a remote facial recognition system (e.g., a process executed on the cloud servers 14). If a person is identified as someone that isn't allowed in the building, or someone that is a known criminal or identified using any other criteria, e.g., a guest, a person of high status, etc., and other statuses, the person's status would be determined by the servers 14, and a message produced and sent to the mixed reality device 13a where the messages is displayed accordingly. The message could be a text message or another indicia that is rendered juxtaposed the image of the person.

The mixed reality device displays 36 images of persons within the field of view of the mixed reality device 13a and through the processed information identifies 38 those persons in the field of view that are not sending signals indicating that they are in possession of a valid badge.

The enhanced security identification process 30 determines 39 whether there is a correspondence between signals indicating person(s) are in possession of a valid badge or not. For persons without a valid badge, these persons are identified 40 in the display of the mixed reality device 13a by the mixed reality device 13a rendering an indicium in juxtaposition to the image of the person. For persons with a valid badge, these persons are identified 42 in the display of the mixed reality device 13a by the mixed reality device 13a rendering a different indicium in juxtaposition to the image of the person.

When the platform 10 is configured for enhance security identification, the mixed reality device 13a is used in conjunction with an access control system (not shown). With an access control system, access to a facility (facility) is controlled by requiring each person authorized to be in the facility being in possession of an active, authorizing device, e.g., an active badge, an RFID device or by reading a user's phone for identifying and authentication information.

The platform 10, executing the enhanced security identification process 30 addresses the technical problem of how to determine whether a person is authorized to be in a facility or a portion of a facility especially in situations when a badge is not required. The enhanced security identification process 30 provides a relatively accurate way for, e.g., a guard to look at a person and challenge that person even if the person is merely carrying an RFID device or a phone. One of the aspects is that when the guard is looking persons in the facility, the enhanced security identification process 30 can cause the mixed reality device 13a to display an indicator that indicates whether that person (which the guard is currently viewing) is authorized to be in the current location in which the guard sees the person. The mixed reality device 13a will send a live video stream to the cloud computers 14 that apply various analytics (facial recognition and the like) to the video stream to determine characteristics, e.g., facial features that are used in facial recognition. If the person currently being view is authorized to be in the location this can be determined as shown in FIG. 4.

Referring now to FIG. 4, details of the processing 38 (FIG. 3) for processing information from mixed reality devices and badge readers to identify persons in the field of view are shown. Initially, as explained in FIG. 3, the platform 10 acquires information from badge readers and live video from mixed reality devices 13a-13c.

The platform 10 applies 50 facial recognition to extract features from the live video stream. The platform 10 uses 52 the extracted features to retrieve stored extracted features from the database 23. This can be accomplished in several ways, including using ranges of extracted features as indices into the database. The platform 10 compares 54 extracted features to stored extracted features from the database 23. This can be accomplished in several ways, including using ranges of extracted features as indices into the storage. The platform 10 attempts to match 58 the extracted facial features from the image to stored extracted facial features of persons known by the servers to be authorized or to be unauthorized persons for that facility. From this comparison the platform 10 determines none (when there are no matches) to one or possibly many possible matches (based on accuracy of the data) to facial feature profiles of persons known by the servers to be authorized or to be unauthorized persons for that facility. With no matches, this can be used to generate the indicium (FIG. 3) to indicate that the person may not be an authorized person. With many matches this may also be used to generate an indicium that the person may not be an authorized person.

With no matches cause server 14 to signal device 13a to generate an indicium no profile 60a (e.g., a red highlight or box), a single match or several matches to persons identified as not allowed in the building or known criminal, etc., identify in the mixed reality system 13a display accordingly with an assigned type of indicium (e.g., a red highlight or box) 60b and with one match to an authorized person, cause the server 14 to signal the device 13a to generate the different indicium (e.g., a green highlight or box) 60c.

Thus, the servers 14 by executing the facial recognition can identify from the video feeds potential persons that are unauthorized. The servers 14 communicate this determination to one or more relevant mixed reality devices 13a-13c, e.g., 13a. The relevant mixed reality device can be in one instance, the device, e.g., relevant mixed reality device 13a that sent the video and in other instances, the servers 14 can capture a frame of the sent video and send that frame along with a command to apply the indicia to others of mixed reality devices 13a-13c, especially, those that the servers 14 determine are in an area close to e.g., mixed reality device 13a.

The image of the person can be highlighted in the display of mixed reality device 13a by placing an indicator on the person's image as that person travels through the facility. For instance, a red box can be used to highlight an unauthorized person and no highlight or a green highlight can be used if the person is authorized. Such video can be obtained from the mixed reality device 13a in some instances, and in other instances the video can be obtained from installed video surveillance systems already installed in the facility.

In order to determine position and possess of an active, authorizing device (e.g., an active badge or authorized cellphone, etc.), the facility could be configured with ceiling mounted antennas (and r.f. hotspots or detectors) and video cameras. With the r.f. signals the servers 14 can map movement of the person by use of the continually fed live video from the cameras and signals from the antennas.

The cameras can be controlled by the servers to cause the cameras reposition in order to track the person, and the mixed reality device display 13a captures faces of persons in the view of the camera mounted on the mixed reality system. The video sent to the servers 14 continually apply the facial recognition processing. Depending on the result, e.g., whether the particular face is recognized as allowed or not allowed or unrecognized the face comes back to the mixed reality device appropriately highlighted.

Another approach uses access control via a phone or another type of authentication device that is associated with a set of facial features that can be identify by facial recognition to establish ownership of the authentication device and authorized access or unauthorized access. An ID signal or another type of signal is received from the authentication device by r.f. sensors disposed in the facility along with a set of facial features extracted from the video. The ID signal and set of facial features are sent to authentication engine to verify that the person carrying the device is the user associated with the authentication device.

Figure 5:
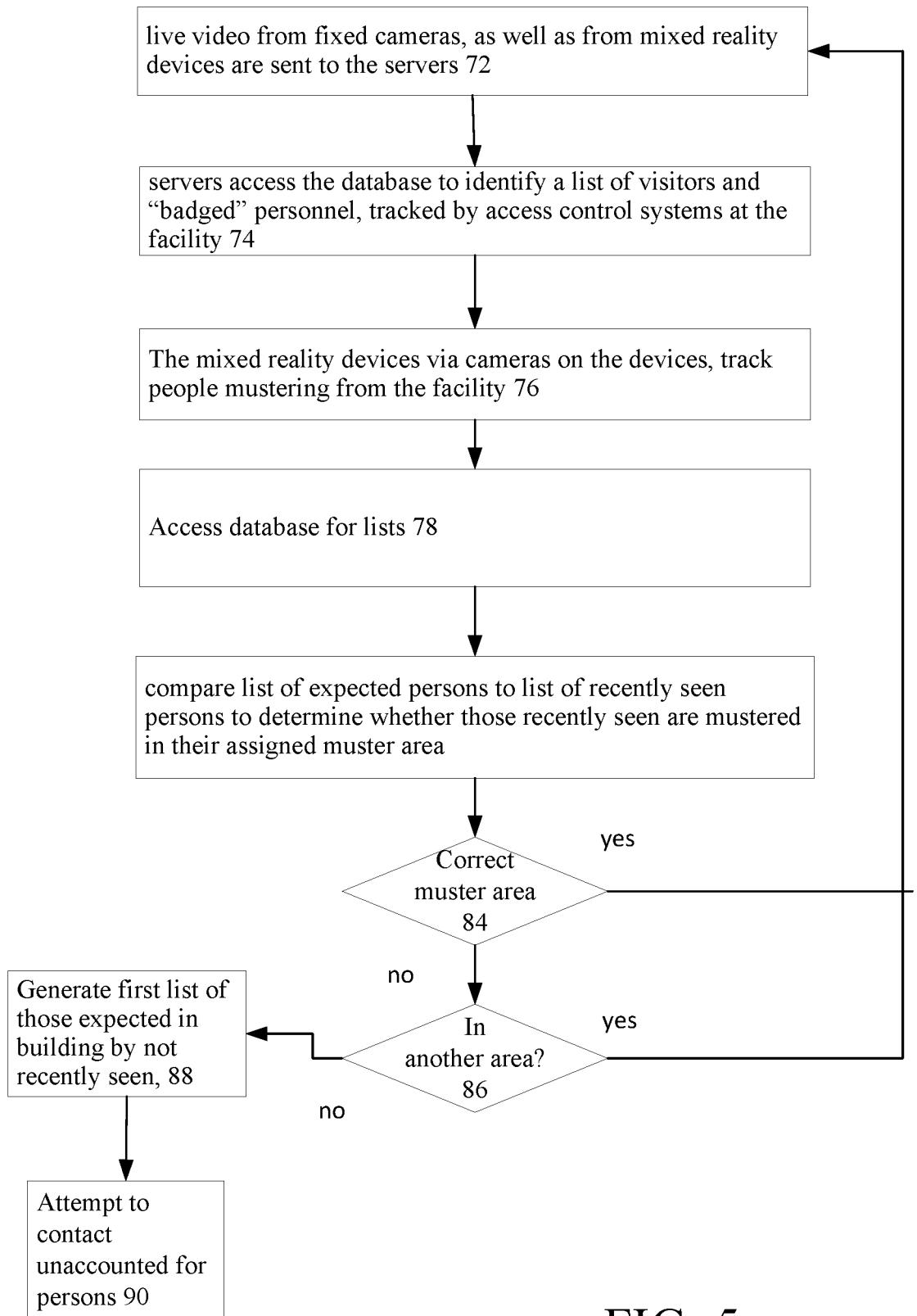

Referring now to FIG. 5, a mustering application 70 can be executed in the servers 14. During an emergency, live video from fixed cameras, as well as from mixed reality devices 13a-13c are sent 72 to the servers 14. The servers 14 access the database 23 to identify 74 a list of visitors and badged personnel, tracked by access control systems at the facility.

The mixed reality devices 13a-13c, via cameras on the devices, track 76 people mustering from the facility. The mixed reality devices 13a-13c can track individuals that have checked in and those that have not checked in, but have been observed by the cameras. The database 23 maintains the following:

A first list of expected persons, e.g., those that possess a permanent badge and those that possess a current visitor badge A second list of persons clocked into building via, verified video or other access control (both badged persons and visitors) over a period of time.

A third list of persons clocked into building via, verified video or other access control (both badged persons and visitors) over a period of time and which are likely still in the building at the time when the emergency was declared. This third list can be derived from the second list to which is applied some forecast analytics to filter out those that no longer are expected to be in the facility.

A list of recently observed persons that is derived from capturing facial features from video (fixed cameras as well as camera on mixed reality systems) at designed muster areas of the facility.

One way entries in these lists can be represented is as a simply list of names of persons, which is obtained from database 23. Another way that the entries in these lists are represented as a data structure where an entry for a particular individual would include at least some of:

<set of facial features that need to be matched>
<ID of authentication device>
<assigned muster area>
<personal profile information>
  <identifying characteristics>
    <name>
    <mobile number>
    etc.

The servers 14 compare 80 the list of expected persons to the list of recently seen persons to determine 84 whether those recently seen are mustered in their assigned muster area, first result list, and if not in the assigned area, whether the persons are mustered in another area, second result list. From these two result lists a list is generated of unaccounted for persons 88. This first result list includes all persons that were expected in the building but which have not been accounted for by being recently seen. The system can attempt to contact 90 those on the list. In addition to a conventional text message that can be sent to devices in possession of all persons on the expected list, automatic or manual methods can be used to specifically contact those missing persons by sending telephoning their mobile devices.

A muster captain (person in charge of the muster) can use the first and second result lists generated above to present additional persons and options on how to track to the muster captain. For example, after a short period of time, e.g., a few minutes after assertion of the emergency condition, and taking into consideration that all persons should have mustered by that point, the mixed reality device display messages to the muster captain and present options to send to the devices of specific unaccounted for persons, do send text or voice messages etc. Any responses from these persons which indicate that the person is not in the facility, (e.g., has mustered, is at home, etc.) is used to remove that person from the unaccounted for list.

The system described above can be used by a security guard or law enforcement when they are looking for a particular person. For example, if a child is lost, the mixed reality device can identify the child, as the security guard scans a crowd of people. This would be accomplished in a similar manner as set out above, e.g., the video would be captured and sent to the cloud where it would be processed, to identify a child and highlight the child based on any characteristics inputted into the system or by using templates.

Alternatively, when law enforcement enters a building, officers carrying the mixed reality device may need to know, which of the occupants, is an undercover police officer. That person can be identified as undercover with a notification in the mixed reality system, e.g., by detecting of characteristics of the person, electrical signals, r.f. id., etc.

Therefore, for this application specifically and in general the data feeds from cameras and other sensors at the facility would transmit data that is encrypted. Similarly, cameras on the mixed reality device would transmit data in encrypted form. Moreover, when the servers send data to the mixed reality devices, that data would also be in encrypted form so that only those authorized mixed reality device(s) would be able to view the identified undercover officer.

Figure 6:
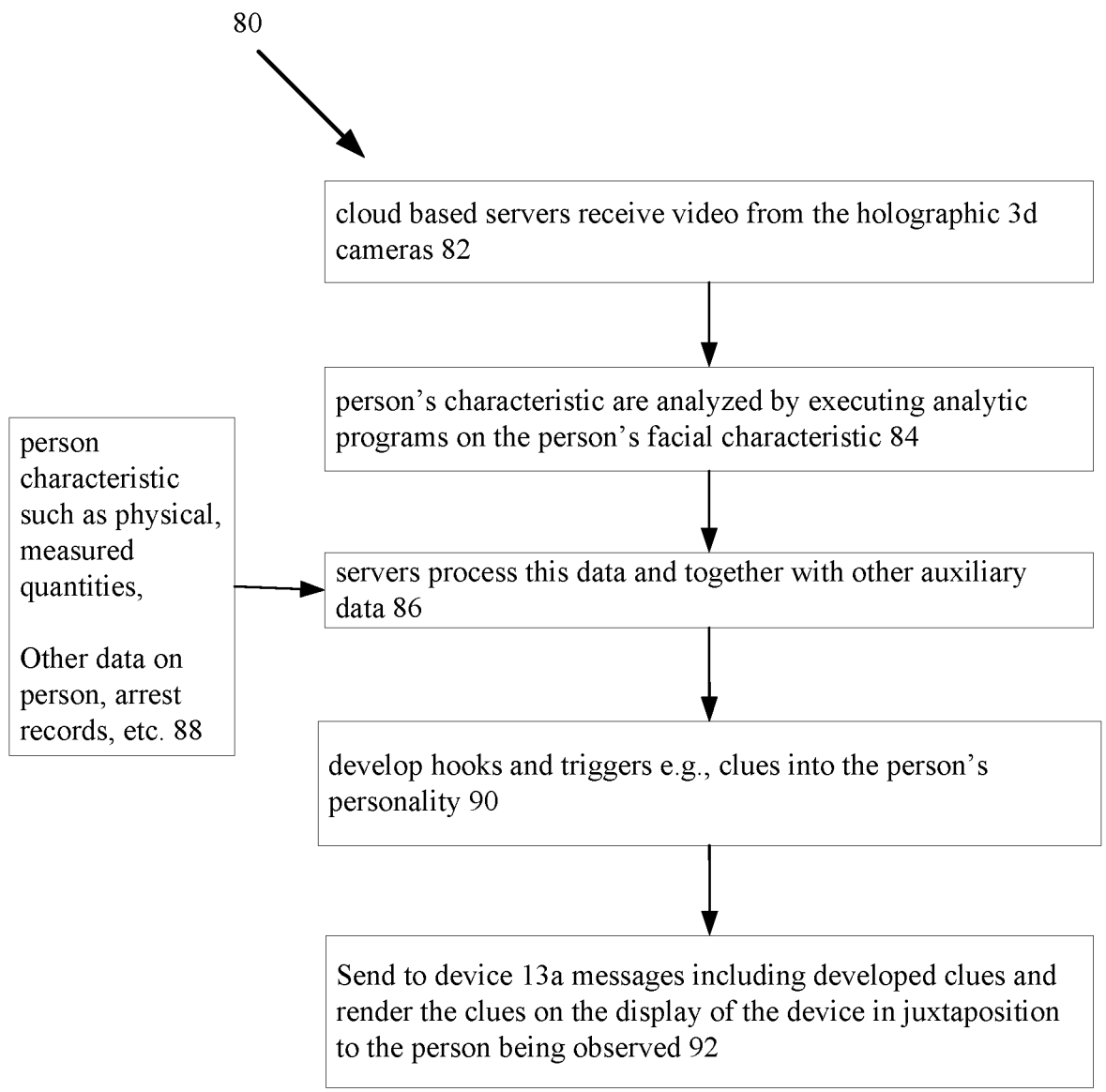

Referring now to FIG. 6, using the mixed reality device technology mixed reality "trans-portation" process 80 is provided. The mixed reality technology can be extended to have two or more people wearing mixed reality devices at different locations. At each location there are holographic 3d cameras that display on the other person's mixed reality device. These cameras are used to capture 82 video data that the servers used to build a hologram. This allows both people to communicate while allowing them to see a hologram of the other person, giving the illusion of presence. This technology can be used in a system designed for law enforcement that allows interrogation of suspects located in remote locations.

The cloud based servers 14 receive 82 video from the holographic 3d cameras deployed at the location of the person being integrated. The person's facial characteristic are analyzed 84 by executing analytics programs on the person's facial characteristic as the person is being interrogated. The servers 14 process this data and together with processing 86 of other auxiliary data that is collected 88 from the person being integrated at the location can develop 90 hooks and triggers e.g., clues into the person's personality.

Sensor devices can be affixed to the person to generate complex outputs from the processing so that the servers 14 execute algorithms that analyzes the foregoing characteristics of the person as that person is being interrogated, and generates the above clues that are communicated 92 to the officer wearing the mixed reality device 13a.

An exemplary algorithm is an unsupervised learning algorithm. The system applies unsupervised algorithm learning models to analyze measured sensor data from the person in comparison with facial features generated from the received video from the holographic 3d cameras. These unsupervised algorithms are used to produce a model that can be used to produce clues regarding insights into a person's behavior. The system produces a list of one or more clues that may result in on or more messages being sent to the user device 13a as well as other computing systems. A prediction system uses various types of unsupervised machine learning models including Linear/Non-Linear Models, Ensemble methods etc.

A logical view of the system can have at a bottom layer a raw characteristics layer that is sensors values and monitoring data from the person. Typically monitoring includes devices/sensors that measure blood pressure, pulse rates, sweating, breathing rates, etc. Also in this layer is the facial processing that produces facial characteristics. The middle layer is an abstraction layer that abstracts these raw events as state information and triggers that produce a state as a concise semantic representation of the underlying behavior information of the person described by time and various sensor values at that point in time. An upper layer being a decisions layer that is used to produce clues. The processing for state representation collects from the database 23s and directly from the devices background data and sensor data.

An example of the sensor values is shown below (using fictitious data):

Person ID: <12342>
Dystopic pressure: <90>
Systolic pressure: <181>
Pulse rate: <102>
Background data:
  Prior arrests <2>
  Prior convictions <0>

As these sensor values that represent a data instance for a particular individual in a single point in time, a state engine can converts these sensor data into semantic representations of the state of the person at instances in time. The state engine uses the converted sensor semantic representation of the sensor data collected from the facility to determine the empirical characteristics of the person. The state engine assigns an identifier to the state, which correspond to the clues. This result can be used as a model from which other persons can be measured and the identifier can be clues that are sent to the person using the device.

Figure 7:
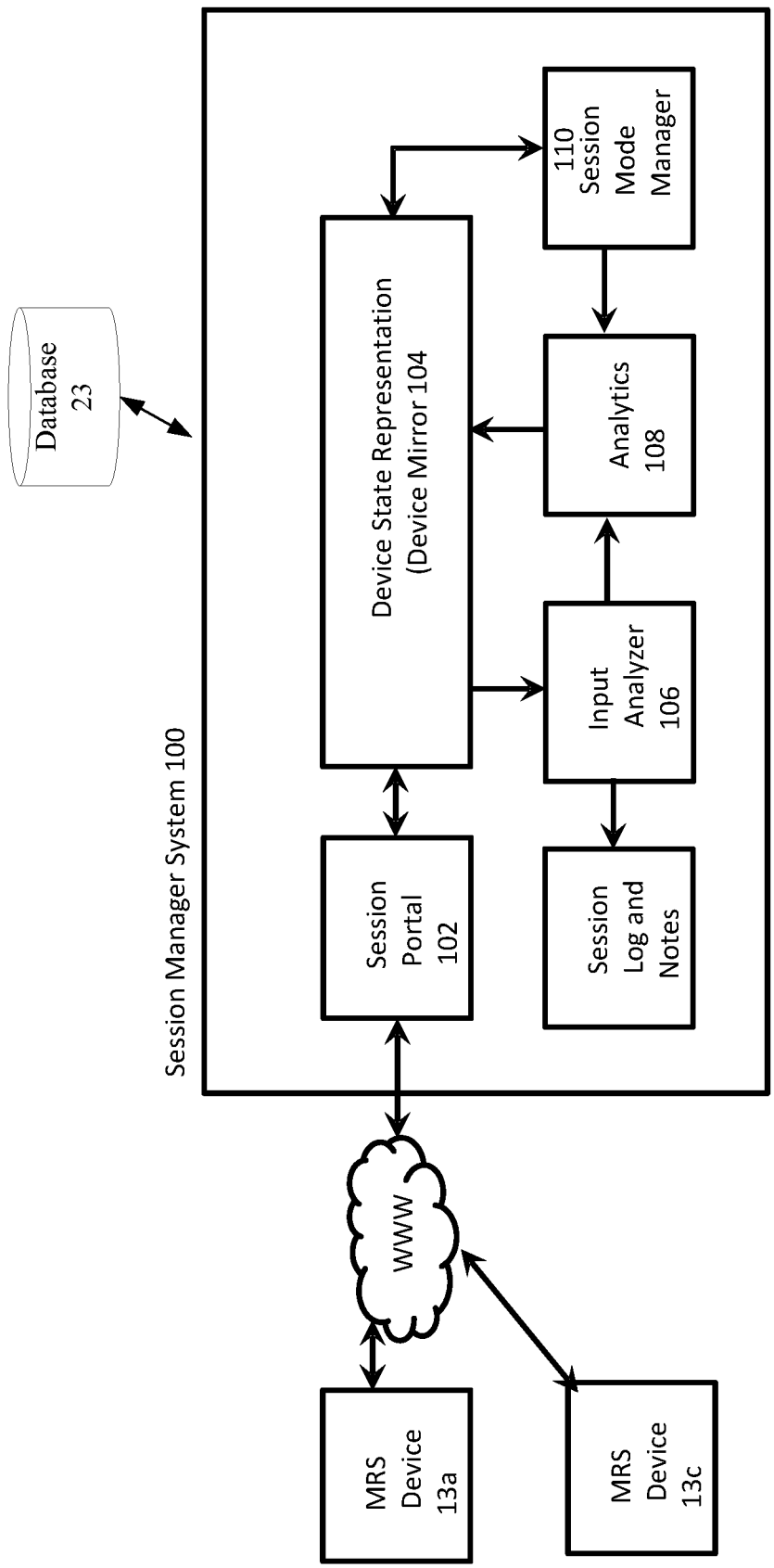
FIG. 7 shows the AR/VR session manager.

Referring now to FIG. 7, an AR/VR (mixed reality) session manager system 100 (session manager) 100 that executes on the servers 14 is shown. The session manager 100 interacts with the mixed reality devices 13a-13c over the Internet using a session portal 102, e.g., a web service API, or in another embodiment, a dedicated socket with SMTP or other transfer protocol. The session portal 102 is bi-directional meaning that each of the mixed reality devices (MRS) 13a-13c can send data to the session manager 100 and receive data from the session manager 100. The mixed reality devices (MRS) 13a-13c send updates on their states to the session manager 100. The states of the mixed reality devices 13a-13c are represented virtually or mirrored in a device state representation 104 inside the session manager 100.

Input from the mixed reality devices (MRS) 13a-13c to the session manager 100 is used in analytic programs executed on the servers. For example, while cameras in the facility can be sending video feeds to the servers that send relevant data to the mixed reality devices (MRS) 13a-13c, cameras on the mixed reality device 13a-13c may send video of an area showing the current state of the facility being monitored by the security system. This video can be analyzed by input analyzer 106 using various techniques to inform analytical manager 108 that inputs to analytic programs (not shown) executing on the servers 14. The analytics manager 108 uses a current mode and inputs presented to it, in order to decide what to present (virtually) to the user on the device viewer and what to request of the analytics executing on the server. Information presented is produced by the analytics manager 108 using data received from the various analytical programs that execute various analytics both conventional as well as to be developed. The session mode manager 110 monitors the mode selected by the user (as mirrored in the device state representation) and informs the analytics manager of the selection. Session logs and notes (not referenced) can also be stored.

In some embodiments, the session may be logged by the input analyzer 106, including any notes or annotations provided by at least some users of the mixed reality devices 13a-13c, e.g., verbal or text sent from the mixed reality devices 13a-13c or otherwise. This locale log/record in the session manager 110 may be backed up in an external database 23 or other databases (not shown) for long-term storage, reporting, and further analysis. This local session and long-term storage may also include a full record or recording of part or all of the session, rather than just the user notes. The mixed reality device 13a-13c can be controlled via a switch on the device, a voice command, and/or a hand gesture that can be used to awakens the device (i.e., loads operating system components and prepares for input) when the device senses motion or can be used to request inputs to the device from the servers 14. The device may require input of a user id and password to enable further operation and interaction with the user and servers 14.

The sensor network illustrated in FIG. 1, is an example of a network that collects and analyzes data from various sensor devices. Other configurations of servers and gateways can be used. In addition, the session manager system 100 can be implemented in the servers 14 or in local or detached server systems.

The servers 14 can be any of a variety of computing devices capable of receiving information, such as a server, a distributed computing system 10, a rack-mounted server and so forth. Servers 14 may be a single server or a group of servers that are at a same location or at different locations. Servers 14 can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Other embodiments are within the scope of the following claims.

What is claimed is:

1. A system comprises:
   detectors that detect presence of r.f. emitters in a facility that provide indications of valid authorizing devices;
   one or more server systems configured to:
   receive the indications of valid authorizing devices;
   receive images of persons within a field of view of camera;
   process the received images to determine information that identifies persons in the field of view;
   determine whether those identified persons are with at least one of the valid authorizing devices based on a correspondence between the indications of valid authorizing devices and the information that identifies persons in the field of view; and
   cause a mixed reality device to render an indicium on a display of the mixed reality device according to whether the identified persons in the field of view or unauthorized are in possession of at least one of the valid authorizing devices.

2. The system of claim 1 wherein the mixed reality device is coupled to a system that is configured to execute facial recognition processing on the images.

3. The system of claim 1 wherein the mixed reality device displays the images of persons within the field of view and identifies by the indicium those persons in the field of view that are not sending signals indicating that they are in possession of a valid badge.

4. The system of claim 3 wherein the mixed reality device renders video of persons within the field of view of the mixed reality device and identifies by the indicium those persons in the field of view that are sending signals indicating that they are in possession of a valid badge.

5. The system of claim 1 wherein the indicium is a first indicium and the mixed reality device displays the images of persons within the field of view and identifies by the first indicium those persons in the field of view that are not sending signals indicating that they are in possession of a valid badge and identifies by a second, different indicium those persons in the field of view that are sending signals indicating that they are in possession of a valid badge.

6. The system of claim 1 wherein the one or more servers systems access a database for IP addresses of nearby video cameras and form queries that are sent to those cameras through the network to control positioning of the cameras to track the persons when identified as being in possession of at least one of the valid authorizing devices.

7. The system of claim 1 wherein
the mixed reality device comprises:
a processor device;
a memory in communication with the processor device;
a head mounted display device including a stereoscopic 3D display;
a storage device that stores a program of computing instructions for execution by the processor using the memory, the program comprising instructions configured to cause the processor to:
receive data from the one or more server systems;
send a request to the one or more server systems for addition data pertaining to a message received from the server systems; and
render information on the head mounted display device; and
a session manager that controls interactions with the mixed reality device over the Internet using a session portal that includes a web service API or a dedicated socket with a transfer protocol.

8. The system of claim 1, wherein the one or more server systems are further configured to:
cause the mixed reality device to render a first indicium on the display of the mixed reality device according to a first one of the identified persons possessing at least one of the valid authorizing devices; and
cause the mixed reality device to render a second indicium on the display of the mixed reality device according to a second one of the identified persons not possessing at least one of the valid authorizing devices, wherein the first indicium and the second indicium have respective different colors.

9. The system of claim 8, wherein the first indicium and second indicium are rendered on the display of the mixed reality device as outlines of the first and second identified persons, respectively.

10. The system of claim 8, wherein the first indicium and second indicium are rendered on the display of the mixed reality device in juxtaposition to the images of the first and second identified persons, respectively.

11. A method, comprising:
detecting presence of r.f. emitters in a facility that provide indications of valid authorizing devices;
receiving the indications of valid authorizing devices;
receiving images of persons within a field of view of camera;
processing the received images to determine information that identifies persons in the field of view;
determining whether those identified persons are with at least one of the valid authorizing devices based on a correspondence between the indications of valid authorizing devices and the information that identifies persons in the field of view; and
causing a mixed reality device to render an indicium on a display of the mixed reality device according to whether the identified persons in the field of view are in possession of at least one of the valid authorizing devices.

12. The method of claim 11, wherein the mixed reality device is coupled to a system that is configured to execute facial recognition processing on the images.

13. The method of claim 11, wherein the mixed reality device displays the images of persons within the field of view identifies by the indicium those persons in the field of view that are not sending signals indicating that they are in possession of a valid badge.

14. The method of claim 13, wherein the mixed reality device renders video of persons within the field of view of the mixed reality device and identifies by the indicium those persons in the field of view that are sending signals indicating that they are in possession of a valid badge.

15. The method of claim 11, wherein the indicium is a first indicium and the mixed reality device displays the images of persons within the field of view and identifies by the first indicium those persons in the field of view that are not sending signals indicating that they are in possession of a valid badge and identifies by a second, different indicium those persons in the field of view that are sending signals indicating that they are in possession of a valid badge.

16. The method of claim 11, further comprising:
accessing a database for IP addresses of nearby video cameras and form queries that are sent to those cameras through the network to control positioning of the cameras to track the persons when identified as being in possession of at least one of the valid authorizing devices.

17. The method of claim 11, wherein the mixed reality device comprises:
a processor device;
a memory in communication with the processor device;
a head mounted display device including a stereoscopic 3D display;
a storage device that stores a program of computing instructions for execution by the processor using the memory, the program comprising instructions configured to cause the processor to:
receive data from the one or more server systems;
send a request to the one or more server systems for addition data pertaining to a message received from the server systems; and
render information on the head mounted display device; and
a session manager that controls interactions with the mixed reality device over the Internet using a session portal that includes a web service API or a dedicated socket with a transfer protocol.

18. The method of claim 11, further comprising:
causing the mixed reality device to render a first indicium on the display of the mixed reality device according to a first one of the identified persons possessing at least one of the valid authorizing devices; and
causing the mixed reality device to render a second indicium on the display of the mixed reality device according to a second one of the identified persons not possessing at least one of the valid authorizing devices, wherein the first indicium and the second indicium have respective different colors.

19. The method of claim 18, wherein the first indicium and second indicium are rendered on the display of the mixed reality device as outlines of the first and second identified persons, respectively.

20. The method of claim 18, wherein the first indicium and second indicium are rendered on the display of the mixed reality device in juxtaposition to the images of the first and second identified persons, respectively.

* * * * *